United States Patent Office 3,049,532
Patented Aug. 14, 1962

3,049,532
DIS AZO DYES
Ermanno Gaetani, Milan, Italy, assignor to Aziende Colori Nazionali Affini ACNA S.p.A., Milan, Italy, a corporation of Italy
No Drawing. Filed Apr. 14, 1960, Ser. No. 22,120
Claims priority, application Italy Apr. 16, 1959
1 Claim. (Cl. 260—191)

The present invention relates to certain new dis azo dyes, insoluble in water, having the following general Formula A:

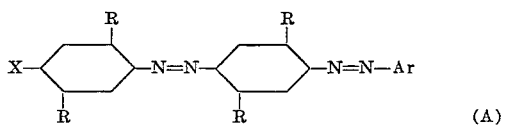

(A)

where R is selected from the group consisting of hydrogen and lower alkyl radicals, Ar is a hydroxynaphthyl radical; when R is an alkyl radical then X is H and the hydroxy group is in the naphthyl nucleus in α-position, while when R is H, then X is a diethyl amine group and the hydroxy group is in the naphthyl nucleus in β-position.

The dyes of the above mentioned general Formula A are suitable for direct dyeing of polyolefinic materials by simple application at the boiling temperature of the dyeing bath. Among the dyes of the general Formula A, the following dyes have shown to be particularly suitable for dyeing polypropylene and polyethylene materials:

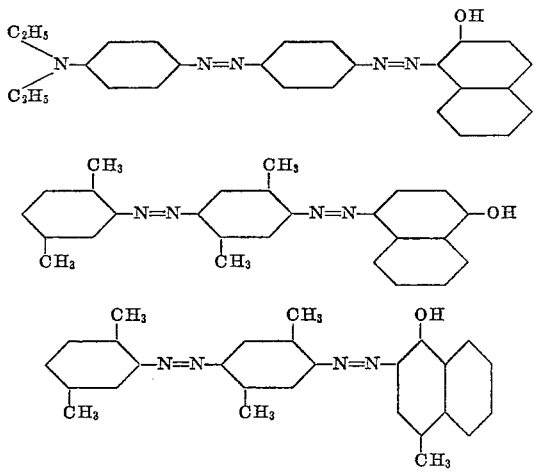

These compounds of general Formula A are obtained by coupling in the presence of a strong base, one mol of an amino azo compound of the type:

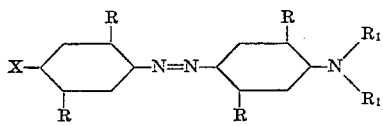

wherein R has the above mentioned meaning and $R_1$ is hydrogen, with a compound of the type HAr wherein Ar has the above mentioned meaning.

The following examples will further illustrate my invention, however without limiting its scope (all parts are by weight unless otherwise indicated).

Example 1

27.8 g. 4-amino-4′-N,N-diethylamino-azo-benzene are diazotised by suspension in 300 g. water and 35 g. hydrochloric acid solution (density 1.17) and adding a solution of 7 g. sodium nitrite in 20 g. water while keeping the temperature between 5 and 10° C.

When the diazotization is completed, the diazo-azo-compound formed is added to a solution of 16 g. β-naphthol and 200 g. water, containing 15 g. conc. sodium hydroxide solution (36 Bé.) and 35 g. 30% ammonia solution.

At the end of the coupling the precipitated dis-azo-dye is filtered, washed until it is neutral and dried. After grinding it consists of a brown powder having a melting point of 174° C. and corresponds to the formula

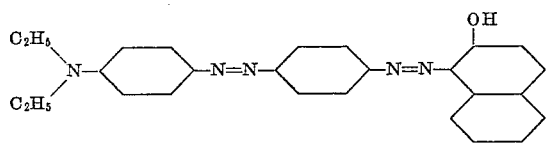

The eluant organic portion of the mixture has the butanol:acetic acid:water ratio of 4:1:5. The dye appears as a uniform violet spot which turns to blue with a hydrochloric acid solution and remains unaltered with alkalies.

Example 2

25.3 g. 4-amino-2,5,2′,5′ - tetramethyl - azo - benzene (prepared according to Noelting, Ber. 18, 2686), are diazotised in 300 g. water and 35 g. hydrochloric acid solution (density 1.17) by addition of a solution of 7 g. sodium nitrite in 20 g. water. The temperature is kept between 10 to 15° C. by careful addition of ice.

When the diazotisation is completed the diazo-azo-compound is added to a solution of 16 g. α-naphthol and 200 g. water containing 15 g. conc. sodium hydroxide solution (36 Bé.) and 35 g. 30% ammonia solution.

At the end of the coupling the bis-azo-compound obtained is filtered, washed until it is neutral and dried; after grinding it consists of a brown-red powder having the formula:

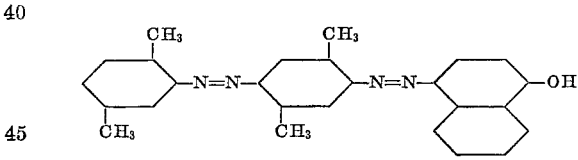

(melting point 177° C.).

By paper chromatography (eluant organic portion of the mixture butanol:acetic acid:water=4:1:5) the dye appears as a violet red spot which turns to blue with alkalies and remains unaltered with acids.

Example 3

25.3 g. 4-amino-2,5,2′,5′-tetramethylazobenzene are diazotised as described in Example 2 and the diazo-azo-compound thus formed is coupled according to the procedure described in Example 2 but with 17.5 g. 1-methyl-4-naphthol (instead of with 16 g. of α-naphthol).

The dye obtained is a brown-red powder having the formula:

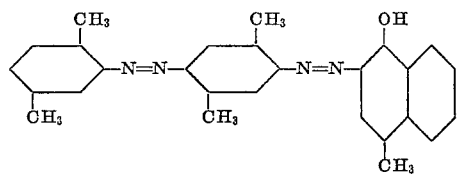

(melting point 218° C.).

By chromatography it appears as a red spot, more violaceous than the compound prepared in Example 2.

Having thus described my invention, what I desire to secure and to claim by Letters Patent is:
A dis azo dye, insoluble in water, having the formula
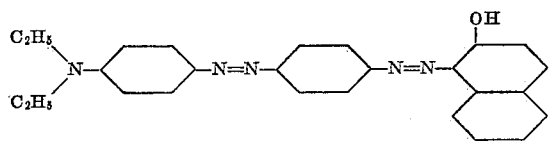
References Cited in the file of this patent
FOREIGN PATENTS
30,080    Germany _____ Jan. 8, 1885
OTHER REFERENCES
Colour Index, 2nd edition, vol. 2, page 2851, vol. 3, p. 3207 (1956), C.I. 26125. (Copy in Library.)

UNITED STATES PATENT OFFICE
CERTIFICATE OF CORRECTION

Patent No. 3,049,532                                              August 14, 1962

Ermanno Gaetani

It is hereby certified that error appears in the above numbered patent requiring correction and that the said Letters Patent should read as corrected below.

Column 2, line 36, for "bis-azo-compound" read -- dis-azo-compound --.

Signed and sealed this 15th day of January 1963.

SEAL)
ttest:

RNEST W. SWIDER                                                  DAVID L. LADD
ttesting Officer                                                    Commissioner of Patents